United States Patent
Horii et al.

(10) Patent No.: US 9,568,648 B2
(45) Date of Patent: Feb. 14, 2017

(54) OPTICAL LAMINATED BODY, METHOD FOR MANUFACTURING SAME, AND POLARIZATION PLATE AND LIQUID-CRYSTAL DISPLAY DEVICE USING OPTICAL LAMINATED BODY

(71) Applicant: DAI NIPPON PRINTING CO., LTD., Tokyo (JP)

(72) Inventors: Atsushi Horii, Okayama (JP); Tomoyuki Horio, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/759,899

(22) PCT Filed: Jan. 9, 2014

(86) PCT No.: PCT/JP2014/050249
§ 371 (c)(1),
(2) Date: Jul. 8, 2015

(87) PCT Pub. No.: WO2014/109370
PCT Pub. Date: Jul. 17, 2014

(65) Prior Publication Data
US 2015/0355386 A1 Dec. 10, 2015

(30) Foreign Application Priority Data
Jan. 11, 2013 (JP) .................. 2013-004101

(51) Int. Cl.
G02B 1/11 (2015.01)
G02B 5/02 (2006.01)
(Continued)

(52) U.S. Cl.
CPC .............. G02B 1/14 (2015.01); B32B 27/08 (2013.01); B32B 27/20 (2013.01); B32B 27/308 (2013.01);
(Continued)

(58) Field of Classification Search
CPC .......... G02B 1/14; G02B 1/111; G02B 1/118; G02B 5/0221; G02B 5/3033; G02B 5/305; G02B 1/105; G02B 5/0242; B32B 27/08; B32B 27/20; B32B 27/308; B32B 2307/42; B32B 2307/538; B32B 2457/20; B32B 2457/202; B32B 2457/208
(Continued)

(56) References Cited

U.S. PATENT DOCUMENTS 7,781,068 B2 * 8/2010 Nakamura ............. G02B 1/105
359/487.01
2007/0231478 A1 * 10/2007 Watanabe ............... G02B 1/111
427/162
(Continued)

FOREIGN PATENT DOCUMENTS

JP 8-197670 8/1996
JP 2003-205563 7/2003
(Continued)

OTHER PUBLICATIONS

Machine translation of Japanese Document 8-197,670 A from https://www.j-platpat.inpit.go.jp; downloaded on Jun. 21, 2016.*
(Continued)

Primary Examiner — Frank Font
(74) Attorney, Agent, or Firm — Hamre, Shumann, Mueller & Larson, P.C.

(57) ABSTRACT

Provided are an optical laminated body including a resin layer on an acrylic base material in which the generation of an interference pattern is suppressed and the adhesiveness
(Continued)

between the acrylic base material and the resin layer is improved and a method for efficiently manufacturing the optical laminated body. Provided are an optical laminated body including a resin layer including a binder resin and organic fine particles B on one surface of an acrylic base material including organic fine particles A, in which, in a standard length of 30 μm taken in a direction perpendicular to a thickness direction of the optical laminated body on a cross-section of the optical laminated body in the thickness direction, when an average depth of three deepest troughs selected from plural troughs in an interface between the acrylic base material and the resin layer is considered as a standard depth and then an average height of three highest crests selected from plural crests in the interface is considered as a standard height, a vertical difference between the standard height and the standard depth is in a range of 150 nm to 500 nm, a polarization plate and a liquid-crystal display device using the optical laminated body, and a method for manufacturing the optical laminated body.

15 Claims, 3 Drawing Sheets

(51) Int. Cl.
G02B 5/30 (2006.01)
G02B 1/14 (2015.01)
G02B 1/111 (2015.01)
G02B 1/118 (2015.01)
B32B 27/08 (2006.01)
B32B 27/20 (2006.01)
B32B 27/30 (2006.01)
G02B 1/10 (2015.01)

(52) U.S. Cl.
CPC ............. *G02B 1/111* (2013.01); *G02B 1/118* (2013.01); *G02B 5/0221* (2013.01); *G02B 5/305* (2013.01); *G02B 5/3033* (2013.01); *B32B 2307/42* (2013.01); *B32B 2307/538* (2013.01); *B32B 2457/20* (2013.01); *B32B 2457/202* (2013.01); *B32B 2457/208* (2013.01); *G02B 1/105* (2013.01); *G02B 5/0242* (2013.01)

(58) Field of Classification Search
USPC .................................................. 359/487.02
See application file for complete search history.

(56) References Cited

U.S. PATENT DOCUMENTS

| | | | | |
|---|---|---|---|---|
| 2007/0268587 | A1* | 11/2007 | Ninomiya | G02B 1/105 359/601 |
| 2007/0291367 | A1* | 12/2007 | Hamamoto | G02B 1/111 359/601 |
| 2008/0198446 | A1* | 8/2008 | Asakura | G02B 5/208 359/352 |
| 2009/0274873 | A1* | 11/2009 | Shinotsuka | B82Y 10/00 428/143 |
| 2009/0317592 | A1* | 12/2009 | Yoshitomi | B32B 3/30 428/142 |
| 2010/0124631 | A1* | 5/2010 | Horio | G02B 1/105 428/142 |
| 2012/0057230 | A1 | 3/2012 | Murakami et al. | |
| 2012/0285528 | A1* | 11/2012 | Takanohashi | C08F 230/08 136/256 |
| 2013/0004710 | A1* | 1/2013 | Kawasaki | C08J 7/047 428/141 |
| 2014/0087139 | A1* | 3/2014 | Rowley | B41C 1/05 428/156 |

FOREIGN PATENT DOCUMENTS

| | | |
|---|---|---|
| JP | 2005-281476 | 10/2005 |
| JP | 2011-81359 | 4/2011 |
| JP | 2012-145748 | 8/2012 |

OTHER PUBLICATIONS

International Search Report for PCT/JP2014/050249, dated Feb. 4, 2014, and English translation (4 pages total).

* cited by examiner

OPTICAL LAMINATED BODY, METHOD FOR MANUFACTURING SAME, AND POLARIZATION PLATE AND LIQUID-CRYSTAL DISPLAY DEVICE USING OPTICAL LAMINATED BODY

TECHNICAL FIELD

The present invention relates to an optical laminated body, a method for manufacturing the same, and a polarization plate and a liquid-crystal display device using the optical laminated body.

BACKGROUND ART

As image display devices, LCDs, touch panel-equipped LCDs, ELs, electronic paper, and the like have been rapidly distributed in recent years in place of CRT displays of the related art due to their characteristics of power saving, lightweight, large thickness, and the like.

For optical laminated bodies used on the surfaces or in the inside of the image display devices, generally, there is a demand for imparting hardness so as to prevent the optical laminated bodies from being scratched while being handled and thus it is common to impart hardness by providing a hard coat layer or the like onto a light-permeable base material. For example, in LCDs, it is common to impart hardness to image display surfaces by using a hard coat film in which a polarization element is disposed on a side facing the image display surface of a liquid crystal cell and a hard coat layer is provided on a light-permeable base material as a polarization plate protective film.

In the related art, as the light-permeable base material for the hard coat film, films made of a cellulose ester represented by triacetyl cellulose have been used. This has been based on an advantage that cellulose esters have excellent transparency and optical isotropy and rarely have a phase difference in the plane (have a low retardation value) and thus rarely change the vibration direction of straight incident polarized light and have a little influence on the display quality of liquid-crystal display devices or an advantage that cellulose esters have appropriate water permeability and thus are capable of drying any moisture remaining in a polarizer when a polarization plate formed using an optical laminated body is manufactured through the optical laminated body.

However, cellulose ester films are materials having disadvantages in terms of cost, have insufficient humid resistance and heat resistance, and have a defect of degrading polarization plate functions such as a polarization function or hue when a hard coat film including the cellulose ester film as a base material is used as the polarization plate protective film in a high-temperature and humidity environment.

Due to the above-described problems of the cellulose ester films, the use of transparent plastic base materials including an acrylic resin as a main component which have excellent transparency, humid resistance, heat resistance, and mechanical strength and can be easily procured from the market at a lower price compared with the cellulose ester films has been proposed.

However, in optical laminated bodies in which hard coat layers are formed on either or both surfaces of a base material including an acrylic resin as a main component, there has been a problem of poor adhesiveness between the acrylic base material and the hard coat layer. In addition, there has been another problem in that an interference pattern is generated and thus the appearance becomes poor due to the refractive index difference between the acrylic base material and the hard coat layer.

With respect to the above-described problems, for example, PTL 1 discloses that the adhesiveness between a base material film and a hard coat layer is improved by applying paint called an anchoring agent or a primer to a base material film in addition to a physical treatment such as a corona discharge treatment or an oxidization treatment and then forming a hard coat layer. In addition, for example, PTL 2 discloses a method in which, regarding the prevention of the interference pattern, protrusions and recesses are formed on the interface between a base material film and a hard coat layer.

However, in the above-described methods, the number of steps necessary to manufacture the hard coat film increases and it is necessary to carry out special treatments and thus the productivity deteriorates.

CITATION LIST

Patent Literature

PTL 1: JP-A-2011-81359
PTL 2: JP-A-8-197670

SUMMARY OF INVENTION

Technical Problem

An object of the present invention is to, under the above-described circumstances, provide an optical laminated body including a resin layer on an acrylic base material in which the generation of an interference pattern is suppressed and the adhesiveness between the acrylic base material and the resin layer is improved and a method for efficiently manufacturing the optical laminated body.

Solution to Problem

As a result of the repetition of intensive studies to solve the above-described problems, the present inventors found that, when a resin layer is formed on one surface of an acrylic base material including organic fine particles and the organic fine particles in the acrylic base material are moved to the resin layer, the above-described problem can be solved. The present invention has been completed on the basis of the above-described finding.

That is, the present invention provides the following inventions.

[1] An optical laminated body including a resin layer which includes a binder resin and organic fine particles B on one surface of an acrylic base material including organic fine particles A, in which in a standard length of 30 μm taken in a direction perpendicular to a thickness direction of the optical laminated body on a cross-section of the optical laminated body in the thickness direction, when an average depth of three deepest troughs selected from plural troughs in an interface between the acrylic base material and the resin layer is considered as a standard depth and then an average height of three highest crests selected from plural crests in the interface is considered as a standard height, a vertical difference between the standard height and the standard depth is in a range of 150 nm to 500 nm.

[2] The optical laminated body according to [1], in which a ratio of an average particle diameter $D_b$ of the organic fine particles B to an average particle diameter $D_a$ of the organic fine particles A is in a range of 1.05 to 1.80.

[3] The optical laminated body according to [1] or [2] in which the organic fine particles A do not form an agglomerate and the average particle diameter thereof is in a range of 10 nm to 400 nm.

[4] The optical laminated body according to any one of [1] to [3], in which on a cross-section of the optical laminated body in the thickness direction, a ratio of the number of the organic fine particles B in a region T, which occupies a depth of 10% from a surface on the opposite side to the acrylic base material in a region S in the resin layer, to the number of the organic fine particles B in the region S is 3% or less.

[5] The optical laminated body according to any one of [1] to [4] in which the organic fine particles B are not exposed on an outermost surface of the resin layer.

[6] The optical laminated body according to any one of [1] to [5], in which the organic fine particles B include the binder resin and the organic fine particles A.

[7] The optical laminated body according to any one of [1] to [6], in which the resin layer is a hard coat layer.

[8] The optical laminated body according to any one of [1] to [7], in which the resin layer further includes a functional component.

[9] A polarization plate formed by laminating the optical laminated body according to any one of [1] to [8] on at least one surface of a polarization film.

[10] An image display device including the optical laminated body according to any one of [1] to [8] and/or the polarization plate according to [9].

[11] A method for manufacturing the optical laminated body according to any one of [1] to [8], in which a composition for forming a resin layer including a solvent is applied on an acrylic base material including organic fine particles A and an acrylic resin-containing binder, the organic fine particles A are moved into the composition, the composition is dried, and a resin layer is formed.

[12] The method for manufacturing the optical laminated body according to [11], in which the solvent includes methyl isobutyl ketone.

[13] The method for manufacturing the optical laminated body according to [12], in which the solvent further includes an alcohol.

[14] A method for improving adhesiveness of an optical laminated body, in which a composition for forming a resin layer including a solvent is applied on an acrylic base material including organic fine particles A and an acrylic resin-containing binder, the organic fine particles A are moved into the resin layer composition, the composition is dried, and a resin layer is formed.

[15] A method for preventing an interference pattern in an optical laminated body, in which a composition for forming a resin layer including a solvent is applied on an acrylic base material including organic fine particles A and an acrylic resin-containing binder, the organic fine particles A are moved into the resin layer composition, the composition is dried, and a resin layer is formed.

Advantageous Effects of Invention

The optical laminated body of the present invention is an optical laminated body including a resin layer on an acrylic base material in which the generation of an interference pattern is suppressed and the adhesiveness between the acrylic base material and the resin layer is excellent and the method for manufacturing an optical laminated body of the present invention is capable of efficiently manufacturing the optical laminated body.

DESCRIPTION OF EMBODIMENTS

According to an optical laminated body of the present invention, there is provided an optical laminated body including a resin layer which includes a binder resin and organic fine particles B on one surface of an acrylic base material including organic fine particles A, in which, in a standard length of 30 µm taken in a direction perpendicular to a thickness direction of the optical laminated body on a cross-section of the optical laminated body in the thickness direction, when an average depth of the three deepest troughs selected from plural troughs in an interface between the acrylic base material and the resin layer is considered as a standard depth and then an average height of the three highest crests selected from plural crests in the interface is considered as a standard height, a vertical difference between the standard height and the standard depth is in a range of 150 nm to 500 nm.

Protrusions and recesses formed along the interface between the acrylic base material and the resin layer (hereinafter, in some cases, abbreviated as the acrylic base material-resin layer interface) in the optical laminated body of the present invention will be described in more detail using the drawings.

Figure 1:
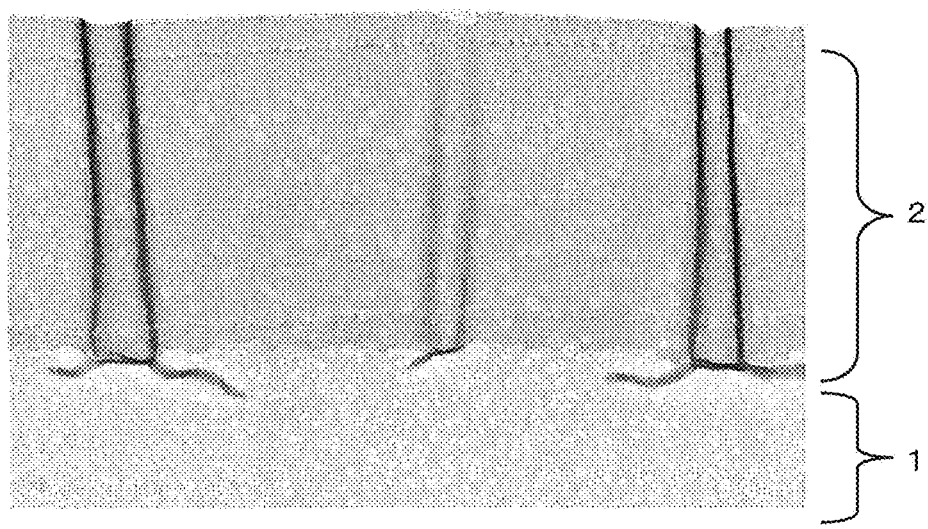
FIG. 1 is a scanning transmission electron microscope photograph (STEM) illustrating a cross-section of an aspect of an optical laminated body of the present invention.
Figure 2:
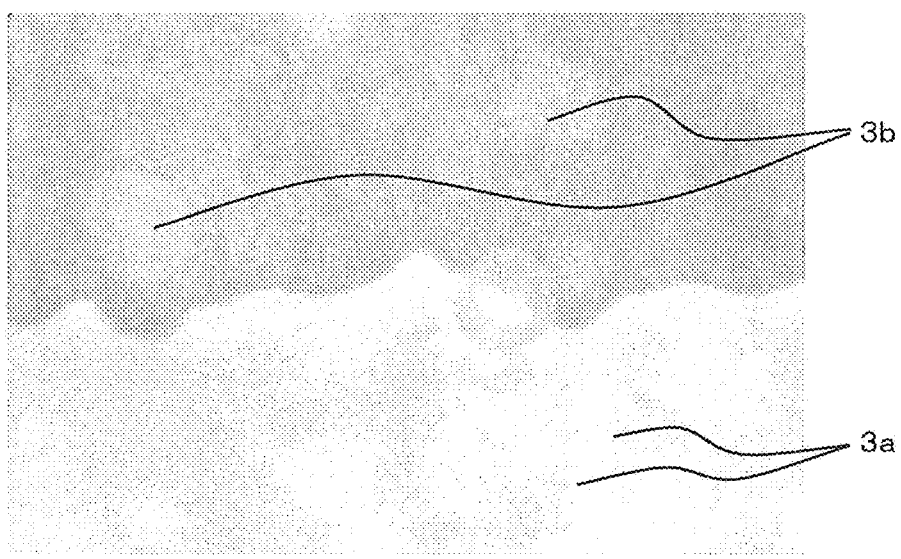
FIG. 2 is a scanning transmission electron microscope photograph (STEM) illustrating an enlarged interface between an acrylic base material and a resin layer in a cross-section of an aspect of the optical laminated body of the present invention.

FIG. 1 is a photograph of a cross-section of the optical laminated body of the present invention taken using a scanning transmission electron microscope (S4800 manufactured by Hitachi High-Technologies Corporation) at a magnification of 6,000 times and an accelerated voltage of 30 kV and FIG. 2 is a photograph of the interface between the acrylic base material and the resin layer taken in the same manner except for the fact that the magnification is set to 50,000 times.

Figure 3:
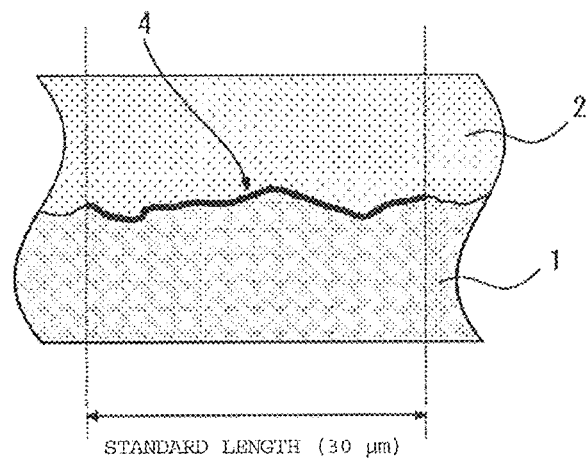
FIG. 3 is a schematic view illustrating a cross-section of an aspect of the optical laminated body of the present invention.

FIG. 3 is a cross-sectional view schematically illustrating the interface between the acrylic base material and the resin layer in the optical laminated body of the present invention.

As illustrated in FIG. 3, in the optical laminated body of the present invention, the acrylic base material-resin layer interface 4 having protrusions and recesses on a cross-section of the optical laminated body in the thickness direction.

(Vertical Difference Between Standard Height and Standard Depth)

In the optical laminated body of the present invention, in the standard length of 30 μm taken in the direction perpendicular to the thickness direction of the optical laminated body on the cross-section of the optical laminated body in the thickness direction, when the average depth of the three deepest troughs selected from plural troughs in an interface between the acrylic base material and the resin layer is considered as the standard depth and then the average height of the three highest crests selected from plural crests in the interface is considered as the standard height, the vertical difference between the standard height and the standard depth is in a range of 150 nm to 500 nm. The vertical difference is more preferably in a range of 175 nm to 450 nm and still more preferably in a range of 200 nm to 400 nm. When the vertical difference is 500 nm or less, it is possible to suppress the occurrence of haze and the degradation of contrast. In addition, when the vertical difference is 150 nm or more, a sufficient anchor effect is generated in the acrylic base material-resin layer interface and thus adhesiveness is improved and an interference pattern is not easily generated.

Specifically, the vertical difference between the standard depth and the standard height is measured as described below.

(Method for Measuring Vertical Difference Between Standard Height and Standard Depth)

Figure 4:
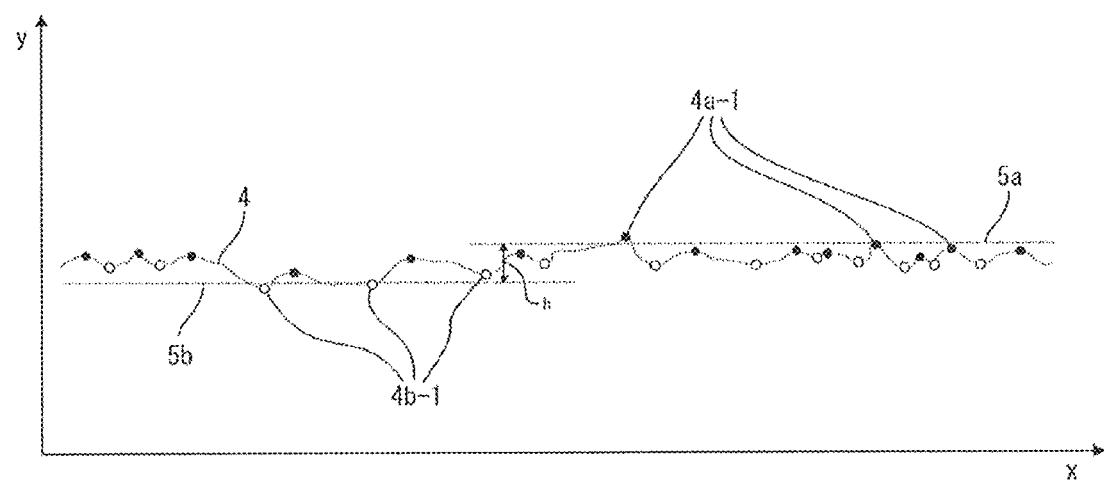
FIG. 4 is a schematic view illustrating a ridge of interface between an acrylic base material and a resin layer and a vertical difference between a standard height and a standard depth in the optical laminated body of the present invention.

As illustrated in FIG. 4, on the cross-section of the optical laminated body in the thickness direction, the acrylic base material-resin layer interface exhibits a ridge having crests and troughs, in an xy plane having an y axis in the thickness direction of the optical laminated body (here, the positive orientation is toward the resin layer) and an x axis in a direction perpendicular to the y axis, a standard length L of 30 μm is taken in the x axis direction, 3 smallest points (4b-1) in terms of the y coordination are selected from infinitesimal points 4b of the ridge in the standard length L, the average y coordinate thereof is considered as the standard depth 5b, on the other hand, 3 largest points (4a-1) in terms of the y coordination are selected from maximal points 4a of the ridge in the standard length L, the average y coordinate thereof is considered as the standard height 5a, and the difference (absolute value) between the standard depth 5b and the standard height 5a serves as the vertical difference between the standard depth 5b and the standard height 5a.

The electron microscopic photograph is preferably taken using a scanning transmission electron microscope at a magnification in a range of approximately 10,000 to 60,000.

In addition, in the optical laminated body of the present invention, on the cross-section of the acrylic base material and the resin layer in the thickness direction, the acrylic base material-resin layer interface exhibits a ridge having crests and troughs and the length of the ridge corresponding to the standard length of 30 μm taken in the direction perpendicular to the thickness direction of the acrylic base material and the resin layer is preferably in a range of 31 μm to 50 μm and the length of the ridge is more preferably in a range of 33 μm to 42 μm. When the length of the ridge is 31 μm or more, the acrylic base material-resin layer interface has a sufficient area and the adhesiveness is improved. In addition, since the area of flat portions decreases, the length of the ridge of 31 μm or more is preferred from the viewpoint of suppressing the generation of an interference pattern. On the other hand, when the length of the ridge is 50 μm or less, an increase in interface reflection in the optical laminated body is suppressed and the degradation of contrast is suppressed. In addition, the length of the ridge of 50 μm or less is also preferred from the viewpoint of suppressing the occurrence of haze.

Specifically, the length of the ridge is measured as described below.

(Method for Measuring Length of Ridge Corresponding to Standard Length of 30 μm)

Here, the length of the ridge corresponding to the standard length of 30 μm can be measured through, for example, the image analysis of a cross-section obtained using image analysis software (IMAGE-PRO, manufactured by Media Cybernetics, Inc.). Specifically, an image on which cross-section observation is carried out using an electron microscope or the like is used, the standard length is set in a straight line between the resin layer and base material film edge portions in the image using the image analysis software, and the length of the interface corresponding to the standard length is measured using the image analysis software. More specifically, image analysis software Image-Pro Plus, Sharp Stack Version 6.2 is used, operation procedure are carried out in the following order, calibration wizards for measurement, calibration, and spaces, calibration of an active image and selection for microns as a unit, furthermore, definition lines are drawn in accordance with the scales of the image, and calibration is carried out. After the calibration, the standard length is set between two points at both ends of the interface by distance measurement. Next, a trace line is produced by manual measurement (threshold value=3, smoothing=0, speed=3, noise=5, automatic), a curve is automatically measured by matching the standard to the ends, and the actual measurement value is read and used as the length of the interface.

<Acrylic Base Material>

The acrylic base material includes the organic fine particles A and an acrylic resin-containing binder.

(Acrylic Resin-Containing Binder)

In the optical laminated body of the present invention, since the acrylic base material includes an acrylic resin binder, compared with an optical laminated body including a base material made of triacetyl cellulose (TAC), humid resistance and heat resistance are excellent and it is possible to preferably prevent the generation of wrinkles. In the present specification, the "acrylic resin" refers to an acryl-based resin and/or a methacryl-based resin.

Compared with the base material made of TAC, a base material film including the acrylic resin has excellent mechanical strength and smoothness, has a low moisture vapor transmission rate, and has excellent durability such as moisture resistance and heat resistance in a high-temperature and high-humidity environment.

The acrylic resin is preferably a polymer having an alkyl methacrylate unit as a main body. Specifically, the acrylic resin may be a polymer of alkyl methacrylates alone or a copolymer for which two or more kinds of alkyl methacrylates are used and may be a copolymer of 50% by mass or more of an alkyl methacrylate and 50% by mass or less of a monomer other than the alkyl methacrylate. As the alkyl methacrylate, generally, an alkyl methacrylate having an alkyl group with 1 to 4 carbon atoms is used and, among them, methyl methacrylate is preferably used.

In addition, the monomer other than the alkyl methacrylate may be a monofunctional monomer having one polymerizable carbon-carbon double bond in the molecule or a polyfunctional monomer having two or more polymerizable carbon-carbon double bonds in the molecule, but the monofunctional monomer is preferably used. Examples thereof include alkyl acrylates such as methyl acrylate or ethyl acrylate, styrene-based monomers such as styrene and alkyl styrene, unsaturated nitriles such as acrylonitrile and methacrylonitrile, and the like. In a case in which an alkyl acrylate is used as a copolymerization component, the alkyl group generally has approximately 1 to 8 carbon atoms. Regarding the monomer component of the acryl-based resin, the content of the alkyl methacrylate is preferably 70% by mass or more, more preferably 80% by mass or more, and still more preferably 90% by mass or more, and is preferably 99% by mass or less in relation to the total amount of the monomer.

In addition, regarding the acrylic resin-containing binder, the glass transition temperature (Tg) is preferably in a range of 110° C. to 140° C. and more preferably in a range of 120° C. to 130° C. When the glass transition temperature (Tg) of the acrylic resin-containing binder is 110° C. or higher, it is possible to suppress the generation of thermal wrinkles when the resin layer is formed and the acrylic resin-containing binder is not easily damaged due to a solvent included in a composition for forming the resin layer. On the other hand, when the glass transition temperature thereof is 140° C. or lower, it is easy to form protrusions and recesses in the interface with the resin layer.

The binder resin may include resins other than the acrylic resin and the fraction of the acrylic resin in the total binder resin is preferably 80% by mass or more and more preferably 90% by mass or more.

(Organic Fine Particles A)

As the organic fine particles A, rubber elastic body particles including a layer exhibiting rubber elasticity are preferably used. The rubber elastic body particles may be particles made of a layer exhibiting rubber elasticity alone or may be particles having a multilayer structure of a layer exhibiting rubber elasticity and other layers. When the acrylic base material includes the organic fine particles A, the bending properties of the acrylic base material become favorable and the generation of cracks due to a solvent or the like is suppressed.

In addition, as the organic fine particles A, particles having a core-shell structure made up of a core and a shell are preferably used.

The material of the organic fine particles A is preferably a transparent material and examples thereof include olefin-based elastic polymers, diene-based elastic polymers, styrene-diene-based elastic copolymers, acryl-based elastic polymers, and the like. Among them, acryl-based elastic polymers are preferably used from the viewpoint of the surface hardness, light resistance, and transparency of the optical laminated body and the viewpoint of their capability of maintaining transparency in a wide temperature range in consideration of the fact that the change in the refractive index with respect to the temperature is similar to that of the acrylic resin in the binder.

The acryl-based elastic polymer is preferably a polymer having a (meth)acrylic acid ester as a main body. The acryl-based polymer may be a polymer of (meth)acrylic acid esters alone or a copolymer of 50% by mass or more of a (meth)acrylic acid ester and 50% by mass or less of a monomer other than the (meth)acrylic acid ester. As the (meth)acrylic acid ester, generally, an alkyl (meth)acrylate ester having an alkyl group with 4 to 8 carbon atoms is used. In a case in which a (meth)acrylic acid ester is copolymerized with a monomer other than the acrylic acid ester, examples of the monomer include styrene monomers such as styrene and alkyl styrene, monofunctional monomers such as unsaturated nitriles such as acrylonitrile and methacrylonitrile, and polyfunctional monomers such as alkenyl esters of unsaturated carboxylic acid such as allyl (meth)acrylates and methallyl (meth)acrylates, dialkenyl esters of dibasic acids such as diallyl maleate, and unsaturated carboxylic acid diesters of glycols such as alkylene glycol di(meth)acrylates.

Meanwhile, as described below, the organic fine particles A are preferably made to be appropriately elastic by suppressing the crosslink density from the viewpoint of producing the organic fine particles B by the swelling of the organic fine particles A in the resin layer and the viewpoint of providing a strain-relieving action to the organic fine particles B. In addition, the organic fine particles A are preferably copolymerized with a monomer arbitrarily selected from methyl polymethacrylate, methyl acrylate, butyl acrylate, styrene, acrylonitrile, benzoacrylate, acrylic acid, and methacrylic acid so as to form an acryl elastic copolymer.

The average particle diameter of the organic fine particles A is preferably in a range of 10 nm to 400 nm and more preferably in a range of 50 nm to 300 nm. When the average particle diameter is set to 10 nm or more, it is possible to effectively suppress the propagation of microcracks generated in the acrylic base material and, when the average particle diameter is set to 400 nm or less, it is possible to suppress an increase in haze. In addition, the organic fine particles A preferably do not form an agglomerate in the acrylic base material.

In the measurement of the average particle diameter of the organic fine particles A and the organic fine particles B described below, on an image of a cross-section of the optical laminated body taken using a scanning transmission electron microscope (STEM) at a magnification in a range of 10,000 times to 30,000 times, ten organic fine particles are randomly extracted, the diameters of the respective particles are calculated, and then the number average value thereof is used as the average particle diameter. The diameter of each particle is defined as the average value of the longest diameter and the shortest diameter on the cross-section of the particle. On the same cross-section of the optical laminated body, the same measurement was carried out three times and the average value of the three measurement values was used as the final average particle diameter.

The content of the organic fine particles A in the acrylic base material is preferably in a range of 25% by mass to 45% by mass in relation to the total amount of the organic fine particles A and the binder resin. When the above-described content of the organic fine particles A are blended in, it is possible to suppress the propagation of microcracks generated in the acrylic base material, the film processing aptitude is maintained, and it is possible to suppress an increase in haze.

The thickness of the acrylic base material is preferably in a range of 15 μm to 800 μm. Depending on the use, the thickness can be selected so that the acrylic base material can have a plate shape or can be wound. In a case in which the acrylic base material has a plate shape, the more preferred thickness thereof has an upper limit of 200 μm and a lower limit of 300 μm. In a case in which the acrylic base material is thin enough to be wound, the more preferred thickness thereof has an upper limit of 100 μm and a lower limit of 20 μm. When the thickness of the acrylic base material is 15 μm or more, wrinkles are not easily generated in the optical laminated body of the present invention and, when the thickness thereof is 100 μm or less, the total thinness of the optical laminated body of the present invention or a final product is excellent.

In addition, the acrylic base material may be used after being drawn; however, when the draw ratio is too high, there is a concern that fissures may be caused in the interface region between the organic fine particles A and the binder resin, the organic fine particles A may fly away, or the haze of the optical laminated body may increase.

When the resin layer described below is formed on the acrylic base material, the organic fine particles A are moved into the resin layer and the binder component of the acrylic base material is also moved into the resin layer. Therefore, the thickness of the acrylic base material decreases from the original thickness after the resin layer is formed. The extent of the thickness decrease is preferably in a range of 0.5 μm to 4 μm. When the extent of the thickness decrease is within the above-described range, that is, the acrylic base material-resin layer interface forms a preferable ridge and it is also possible to improve adhesiveness, interference pattern-preventing properties, and hardness. On the other hand, when the degree of the thickness decrease exceeds 4 μm, the interface state deteriorates and, even when a material having a high hardness is used as the material of the resin layer, the hardness of the resin layer decreases. In addition, when the extent of the thickness decrease is less than 0.5 μm, it is not possible to favorably form the ridge of the interface and adhesiveness and interference pattern-preventing properties degrade.

In addition, in the present invention, surface treatments such as a saponification treatment, a glow discharge treatment, a corona discharge treatment, an ultraviolet (UV) treatment, and a flame treatment may be carried out on the acrylic base material as long as the purport of the present invention is not impaired.

<Resin Layer>

The resin layer includes the above-described organic fine particles B. The organic fine particles B are obtained as described below. When a composition for forming the resin layer described below is applied onto the acrylic base material including the organic fine particles A and the acrylic resin-containing binder, the organic fine particles A in the acrylic base material are floated, moved into the composition for forming the resin layer, dried, and cured. At least some components of the binder included in the composition for forming the resin layer penetrate into the organic fine particles A moved from the acrylic base material, thereby producing the organic fine particles B. In the optical laminated body of the present invention obtained using the above-described manufacturing method, the acrylic base material-resin layer interface has a predetermined vertical difference between the standard height and the standard depth in the acrylic base material-resin layer interface as described above.

In the optical laminated body of the present invention, the acrylic resin-containing binder in the acrylic base material and the binder resin in the resin layer are mixed and integrated together near the acrylic base material-resin layer interface. As a result, in a case in which a force is applied in the perpendicular direction of the optical laminated body from the resin layer side and the acrylic base material side, a unique effect is developed so that the optical laminated body does not easily fracture. On the contrary, in a case in which a hard coat layer and the like are simply provided on the acrylic base material, the hard coat layer fractures and the acrylic base material also fractures. This is assumed to be because the physical performances of the acrylic base material and the resin layer smoothly change in the interface and thus stress-strain applied in the perpendicular direction is also smoothly propagated in the interface or elastic organic fine particles are injected near the interface between the acrylic base material and the resin layer in the hard resin layer and thus stress-strain is absorbed in the interface.

The refractive index of the organic fine particles A is, basically, preferably almost equal to the refractive index of the above-described acrylic resin-containing binder in order to prevent the occurrence of internal haze in the acrylic base material. Specifically, the refractive index difference between the organic fine particles A and the acryl resin-containing binder is preferably in a range of 0.00 to 0.03.

In addition, even when the refractive index of the organic fine particles A and the refractive index of the binder resin in the resin layer are different from each other, at least some components of the binder component such as a monomer in the composition for forming the resin layer penetrate into the organic fine particles A during the application of the composition for forming the resin layer onto the acrylic base material, thus, the refractive index difference between the organic fine particles B included in the resin layer (the organic fine particles A moved to the resin layer from the acrylic base material) and the resin layer becomes small, and thus the occurrence of new internal haze is suppressed. In a case in which two materials having different refractive indexes as described above are used, the method of penetrating one component into the other component is capable of changing the refractive index in the interface portion between the two materials in a gradation manner or setting the refractive index to an intermediate value between the refractive indexes of the two materials and is thus effective for the suppression of internal haze.

Therefore, the average particle diameter ($D_b$) of the organic fine particles B preferably absorb the composition for forming the resin layer and thus becomes greater than the average particle diameter ($D_a$) of the organic fine particles A in the acrylic base material. Specifically, when the ratio [$D_b/D_a$] of the average particle diameter ($D_b$) of the organic fine particles B in the resin layer to the average particle diameter ($D_a$) of the organic fine particles A in the acrylic base material reaches 1.05 or more, the internal haze caused by the refractive index difference between the organic fine particles B and the resin layer is decreased, which is preferable. In addition, when the ratio is 1.80 or less, an excessive increase in the particle diameters of the organic fine particles B in the resin layer is suppressed and it is possible to suppress the occurrence of new surface haze caused by the development of protrusions and recesses on the surface of the resin layer, which is preferable. Similarly, $D_b/D_a$ is more preferably in a range of 1.05 to 1.80 and still more preferably in a range of 1.10 to 1.60.

The method for measuring the average particle diameter of the organic fine particles B in the resin layer is the same as the method for the above-described organic fine particles A in the acrylic base material.

In addition, the organic fine particles B in the resin layer may or may not be exposed on the outermost surface of the resin layer, but the organic fine particles are preferably not exposed on the outermost surface of the resin layer since it is possible to effectively prevent the surface of the optical laminated body from becoming uneven and an optical laminated body having excellent resolution, contrast, and the like can be obtained. Meanwhile, when at least some components of the resin layer penetrate into the organic fine particles B, the occurrence of internal haze is prevented and a contribution is made to improve the adhesiveness between the organic fine particles B and the resin layer.

In addition, since the organic fine particles A have a low crosslink density and are appropriately elastic, the organic fine particles have an action of relieving contraction stress when cured and are contracted so as to produce the resin layer and thus the formation of protrusions and recesses on the surface is suppressed and the stress-strain in the resin layer is decreased, which allows the adhesiveness to be maintained.

In the present invention, as described above, the organic fine particles B are preferably not exposed on the outermost surface of the resin layer. In addition, the presence ratio of the organic fine particles B near the surface of the resin layer is more preferably lower than the presence ratio of the organic fine particles B inside the resin layer. Specifically, on a cross-section of the optical laminated body in the thickness direction, the ratio of the number of the organic fine particles B in a region T, which occupies a depth of 10% from the surface on the opposite side to the acrylic base material in a region S in the resin layer, to the number of the organic fine particles B in the region S is preferably 3% or less. When the presence ratio of the organic fine particles B is set to the above-described range, it is possible to prevent a decrease in the hardness of the resin layer.

When the number of the organic fine particles is calculated, the entire resin layer and at least the upper portion of the acrylic base material are photographed and the organic fine particles are visually observed using a STEM cross-section photograph taken at a magnification in a range of 3000 times to 10000 times so that the presence of the organic fine particles can be checked. In addition, in the present invention, STEM cross-section photographs of at least three positions were used, the ratios of the organic fine particles B in the region T to the organic fine particles B in the region S in the resin layer were obtained using the respective STEM cross-section photographs, the average value thereof was calculated, the average value was used as the ratio of the organic fine particles B in the region T, and, in the present invention, this ratio was used as the presence ratio of the organic fine particles B.

Figure 5:
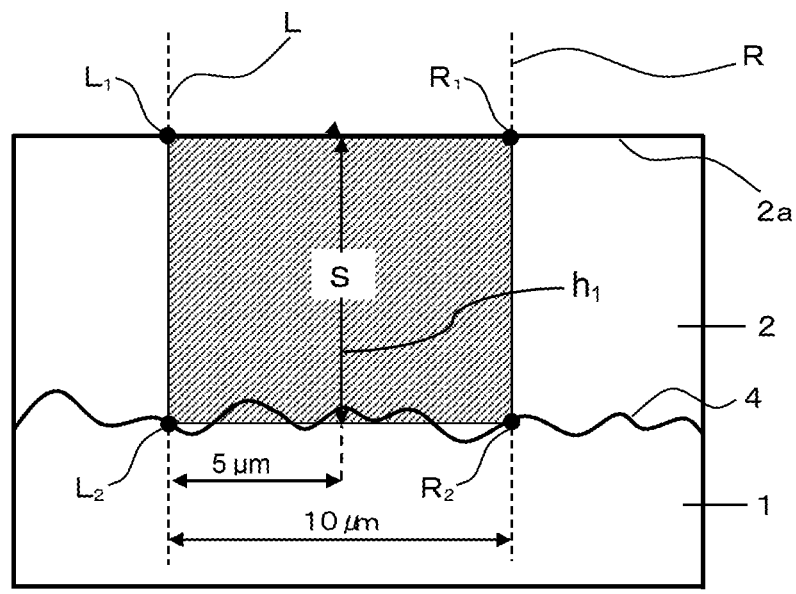
FIG. 5 is a schematic view illustrating a cross-section of the optical laminated body of the present invention which describes the range of a region S.
Figure 6:
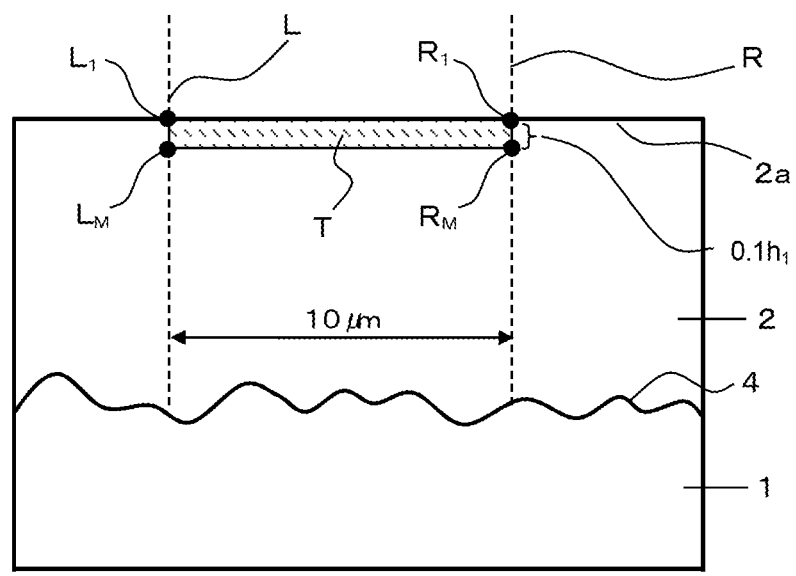
FIG. 6 is a schematic view illustrating a cross-section of the optical laminated body of the present invention which describes the range of a region T.

Hereinafter, the method for determining the region S and the region T will be specifically described with reference to FIGS. 5 and 6.

First, a STEM cross-section photograph is taken so that the layers in the optical laminated body under observation lie in a strictly horizontal manner. Next, a perpendicular line L and a perpendicular line R which are perpendicular to the cross-section photograph and have a gap of 10 μm therebetween are drawn. In addition, an intersection point $L_1$ between the perpendicular line L and the surface of the resin layer, an intersection point $L_2$ between the perpendicular line L and the acrylic base material-resin layer interface, an intersection point $R_1$ between the perpendicular line R and the surface of the resin layer, and an intersection point $R_2$ between the perpendicular line R and the acrylic base material-resin layer interface are respectively provided, and a square region having the above-described four points as vertexes is defined as the region S.

In the region S, the distance between the intersection point $L_1$ and the intersection point $L_2$ and the distance between the intersection point $R_1$ and the intersection point $R_2$ are respectively obtained and the average value thereof is used as the average height $h_1$. In addition, a point 10% of the average height $h_1$ away from the intersection point $L_1$ on a line segment connecting the intersection point $L_1$ and the intersection point $L_2$ is defined as a point $L_M$, a point 10% of the average height $h_1$ away from the intersection point $R_1$ on a line segment connecting the intersection point $R_1$ and the intersection point $R_2$ is defined as a point $R_M$, and a square region having the intersection point $L_1$, the intersection point $R_1$, the point $L_M$, and the point $R_M$ as vertexes is defined as the region T.

The resin layer is preferably a hard coat layer having hard coat performance and the hardness of the hard coat layer is preferably H or more and more preferably 2 H or more in the pencil hardness test (with a load of 4.9 N) according to JIS K5600-5-4 (1999). In addition, the resin layer may include functional particles.

Specific examples of the composition for forming the resin layer which forms the resin layer include an electron radiation-curable resin composition or an ultraviolet-curable resin composition (hereinafter, in some cases, referred to as "the ionizing radiation-curable resin composition") or a thermosetting resin composition.

The electron radiation-curable resin composition contains a photopolymerizable monomer and/or a photopolymerizable prepolymer and/or a photopolymerizable polymer (hereinafter, in some cases, abbreviated as "the photopolymerizable monomer/prepolymer") and the ultraviolet-curable resin composition contains a photopolymerizable monomer and/or a photopolymerizable prepolymer and a photopolymerization initiator.

Examples of the photopolymerizable monomer include monomers having one or more unsaturated bonds such as compounds having an acrylate-based functional group. Examples of the monomers having one unsaturated bond include ethyl (meth)acrylates, ethylhexyl (meth)acrylates, styrene, methylstyrene, N-vinylpyrrolidone, and the like. Examples of the monomers having two or more unsaturated bonds include polymethylolpropane tri(meth)acrylates, tripropylene glycol di(meth)acrylates, diethylene glycol di(meth)acrylates, pentaerythritol tri(meth)acrylates, pentaerythritol tetra(meth)acrylates, dipentaerythritol hexa(meth)acrylates, dipentaerythritol penta(meth)acrylate, 1,6-hexanediol di(meth)acrylate, neopentyl glycol di(meth) acrylate, and the like, polyfunctional compounds obtained by denaturing the above-described monomer using ethylene oxide (EO) or the like, reaction products between the above-described polyfunctional compound and (meth)acrylate or the like (for example, poly(meth)acrylate esters of polyvalent alcohols), and the like. Meanwhile, in the present specification, the "(meth)acrylates" refer to methacrylates and acrylates.

Examples of preferred photopolymerizable monomers in the present invention include compounds having three or more unsaturated bonds and, when this compound is used, it is possible to increase the crosslink density of the resin layer being formed and to improve the coated film hardness. Specifically, an appropriate combination of pentaerythritol triacrylate, pentaerythritol tetraacrylate, polyester polyfunctional (tri- to pentakaidecafunctional) acrylate oligomers, urethane polyfunctional (tri- to pentakaidecafunctional) acrylate oligomers, and the like is preferably used.

The ionizing radiation-curable resin composition may include, in addition to the above-described photopolymerizable monomer, a resin having an unsaturated double bond and a relatively low molecular weight such as a polyester resin, a polyether resin, an acrylic resin, an epoxy resin, a urethane resin, an alkyd resin, a spiroacetal resin, a polybutadiene resin, or a polythiol polyene resin. In this case, the resin refers to not only a monomer but also to a dimer, an oligomer, and a polymer.

The ionizing radiation-curable resin composition may further include a solvent drying-type resin. The joint use of the solvent drying-type resin enables the effective prevention of coating defects on the coating surface. Meanwhile, the solvent drying-type resin refers to a resin that turns into a coat simply by drying a solvent that is added to adjust the solid content during coating such as a thermoplastic resin.

There is no particular limitation regarding the solvent drying-type resin and, generally, a thermoplastic resin can be used.

There is no particular limitation regarding the thermoplastic resin and examples thereof include styrene-based resins, (meth)acrylate-based reins, vinyl acetate-based resins, vinyl ether-based resins, halogen-containing resins, alicyclic olefin-based resins, polycarbonate-based resins, polyester-based resins, polyamide-based resins, cellulose derivatives, silicone-based reins, rubber, elastomers, and the like. The thermoplastic resin is preferably amorphous and soluble in organic solvents (particularly, a common solvent capable of dissolving a plurality of polymers or curable compounds). Particularly, styrene-based resins, (meth)acrylate-based resins, alicyclic olefin-based resins, polyester-based resins, cellulose derivatives (cellulose esters and the like), and the like are preferred from the viewpoint of film-producing properties, transparency, or weather resistance.

In addition, the ionizing radiation-curable resin composition may further include a thermosetting resin described below.

There is no particular limitation regarding the photopolymerizable initiator and a well-known photopolymerizable initiator can be used. Specific examples of the photopolymerizable initiator include acetophenones, benzophenones, Michler's benzoyl benzoate, α-amyloxim ester, thioxanthones, propiophenones, benzyls, benzoins, and acylphosphine oxides. In addition, a photosensitizer is preferably mixed in and specific examples thereof include n-butylamine, triethylamine, poly-n-butylphosphine, and the like.

As the photopolymerizable initiator, in a case in which the photopolymerizable monomer/prepolymer is a resin-based monomer/oligomer/polymer having a radical polymerizable unsaturated group, acetophenone, benzophenone, thioxanthone, benzoin, benzoin methyl ether, or the like is preferably used singly or as a component of a mixture and 1-hydroxy-cyclohexyl-phenyl-ketone is particularly preferred due to the compatibility with an ionizing radiation-curable resin and a little chance of yellow discoloration. In addition, in a case in which the photopolymerizable monomer/prepolymer has a cation polymerizable functional group, as the photopolymerizable initiator, an aromatic diazonium salt, an aromatic sulfonium salt, an aromatic iodonium salt, a metallocene compound, a benzoine sulfonate ester, or the like is preferably used singly or as a component of a mixture.

The content of the photopolymerization initiator in the ultraviolet-curable resin composition is preferably in a range of 1 part by mass to 10 parts by mass in relation to 100 parts by mass of the photopolymerizable monomer/prepolymer. This is because, when the content of the photopolymerization initiator is 1 part by mass or more, the hardness of the resin layer in the optical laminated body of the present invention can be set to the above-described range and, when the content thereof is 10 parts by mass or less, the deterioration of the resin by the remaining of the unreacted initiator is suppressed and there is a concern that the uniformity of the surface of the resin layer may not be obtained.

Regarding the content of the photopolymerization initiator, the more preferred lower limit is 2 parts by mass and the more preferred upper limit is 8 parts by mass in relation to 100 parts by mass of the photopolymerizable monomer/prepolymer.

The thermosetting resin composition used as the composition for forming the resin layer contains a thermosetting resin.

The thermosetting resin is not particularly limited and examples thereof include a phenol resin, a urea resin, a diallyl phthalate resin, a melamine resin, a guanamine resin, an unsaturated polyester resin, a polyurethane resin, an epoxy resin, an amino alkyd resin, a melamine-urea condensation resin, a silicon resin, a polysiloxane resin, and the like.

The composition for forming the resin layer may contain a solvent.

As the solvent, a solvent that easily allows the acrylic base material to be appropriately swollen and allows the organic fine particles A to move into the resin composition is preferably selected. However, unlike the TAC base material widely used in the related art, the acrylic base material swells in almost all kinds of solvents. Therefore, when strongly affected by the solvent and excessively swollen, there are cases in which the acrylic base material may fracture and thus, when the following solvent is selected, it is possible to appropriately swell the acrylic base material, the resin component constituting the base material and the resin component constituting the resin layer move to each other in an appropriately-balanced manner, and it is possible to obtain a preferable ridge in the interface. The solvent can be selected and used depending on the kind and solubility of the resin component being used.

The above-described solvent is preferably an alcohol (methanol, ethanol, isopropanol, or 1-butanol). In addition, in other solvents, there is a tendency that the solvent becomes more favorable as the number of carbons increases and, furthermore, there is another tendency that the solvent having a faster evaporation rate is more favorable. Examples of the solvent include methyl isobutyl ketone from ketones, toluene from aromatic hydrocarbons, propylene glycol monomethyl ether from glycols, and the like and a solvent mixture thereof may also be used.

Particularly, in the present invention, the solvent particularly preferably includes one or more selected from methyl isobutyl ketone, isopropanol, 1-butanol, and propylene glycol monomethyl ethers because the compatibility with the resin and the coatability are excellent, the unique uneven shape of the present application is formed in the acrylic base material-resin layer interface and thus the organic fine particles can be moved to the resin layer, and, furthermore, a disadvantage of the base material being fractured while being processed is not caused. When the above-described solvent is used, it is possible to appropriately swell the base material while the acrylic base material remains unfractured and it is possible to easily move the organic fine particles A to the resin layer by applying the composition for forming the resin layer including the solvent onto the acrylic base material including the organic fine particles A and the acrylic resin-containing binder.

On the contrary, since there are cases in which esters (methyl acetate, ethyl acetate, propyl acetate, butyl acetate, and the like), ketones (acetone, methyl ethyl ketone, cyclohexanone, and diacetone alcohol), cellosolves, ethers (dioxane, tetrahydrofuran, propylene glycol monomethyl ether acetate, and the like), aliphatic hydrocarbons (hexane and the like), aromatic hydrocarbons (xylene), halogenated carbons (dichloromethane, dichloroethane, and the like), cellosolves (methyl cellosove, ethyl cellosolve, and the like), cellosolve acetates, sulfoxides (dimethyl sulfoxide and the like), and amides (dimethyl formamide, dimethyl acetoamide, and the like) excessively swell the acrylic base material and thus there is a concern that the base material may be fractured due to tension, it is preferable not to use the above-described solvents in a case in which tension is applied to the base material. However, there are also cases in which, depending on the compound used for a resin layer composition, the use of the solvent is required such as a case in which the compatibility of the entire composition cannot be obtained without the inclusion of the solvent. In such a case, it is possible to prevent the base material from being fractured by suppressing the total amount of the solvent, the use of which is, originally, preferably restrained, to less than 25% by mass. For example, in a case in which it is necessary to use methyl ethyl ketone, it is preferable to include 75% by mass or more of one or more solvents selected from methyl isobutyl ketone, isopropanol, 1-butanol, and propylene glycol monomethyl ethers, all of which are preferred solvents.

The content fraction of the solvent in the composition for forming the resin layer is not particularly limited and, for example, the content fraction of the above-described preferred solvent is preferably in a range of 75 parts by mass to 300 parts by mass and more preferably in a range of 100 parts by mass to 220 parts by mass in relation to 100 parts by mass of the solid content of the composition for forming the resin layer. When the content fraction of the solvent is within the above-described range, an optical laminated body satisfying the length of the ridge in the above-described standard length of 30 μm and the vertical difference between the standard height and the standard depth can be easily obtained. When the content fraction of the solvent is 75 parts by mass or more in relation to 100 parts by mass of the solid content of the composition for forming the resin layer, the length of the ridge corresponding to the above-described standard length of 30 μm and the vertical difference between the standard height and the standard depth become greater and, when the content fraction is 300 parts by mass or less, the length and the vertical difference become smaller.

In addition, in order to allow the organic fine particles A to be easily moved into the resin composition, the resin layer composition preferably includes a monomer and/or an oligomer and more preferably includes a monomer. This is because the monomer and/or the oligomer are capable of easily penetrating into the acrylic base material together with the solvent. On the other hand, a polymer is not capable of easily penetrating into the acrylic base material.

To the composition for forming the resin layer, depending on the purposes of increasing the hardness of the resin layer, suppressing curing contraction, preventing blocking, imparting stability against heat, humidity, and light, controlling the refractive index, imparting anti-glare properties, changing the properties of the surface of the resin layer, and the like, well-known functional components of the related art such as organic or inorganic fine particles, a dispersant, a surfactant, an antistatic agent, a silane coupling agent, a thickner, a coloration inhibitor, a colorant (a dye or a pigment), a defoamer, a leveling agent, an antifouling agent, an antibacterial agent, an anti-fog additive, a flame retardant, an ultraviolet absorbent, an adhesive reinforcing agent, a polymerization inhibitor, an antioxidant, and a surface reformer may be added.

In addition, a photosensitizer may be mixed into the composition for forming the resin layer and specific examples of the photosensitizer include n-butyl amine, triethyl amine, poly-n-butylphoshine, and the like.

There is no particular limitation regarding the method for preparing the composition for forming the resin layer as long as the respective components are uniformly mixed together and the ionizing radiation-curable resin composition can be prepared using, for example, a well-known device such as a paint shaker, a beads mill, a kneader, or a mixer.

In addition, there is no particular limitation regarding the method for applying the composition for forming the resin layer onto the acrylic base material and examples thereof include a spin coating method, a dipping method, a spraying method, a die coating method, a bar coating method, a gravure coating method, a roll coater method, a meniscus coater method, a flexography method, a screen printing method, a bead coater method.

A coated film formed by applying the composition for forming the resin layer onto the acrylic base material is preferably heated and/or dried as necessary and is cured through the radiation of an active energy ray or the like.

The drying time in the drying step is preferably in a range of 20 seconds to 2 minutes and more preferably in a range of 30 seconds to 1 minute. In addition, the drying temperature in the drying step is preferably in a range of 40° C. to 90° C. and more preferably in a range of 50° C. to 80° C.

When the drying temperature exceeds 100° C., in spite of the selection of a solvent having preferable acryl-swelling properties, there are cases in which the penetrating force of the solvent or the like becomes stronger and the base material is broken and thus the drying temperature is, basically, preferably 90° C. or lower regardless of solvents being used. For example, while methyl isobutyl ketone is a preferable solvent, when the drying temperature is 100° C., there are cases in which the acrylic base material is broken in a case in which tension is applied in spite of methyl isobutyl ketone.

The lowest temperature is preferably 50° C. or higher since the solvent can be dried and it is easy to move the organic fine particles A to the resin layer. For example, in a case in which the methyl isobutyl ketone is used and the drying temperature is 30° C., the coated film is cured using an ultraviolet ray or the like while remaining insufficiently dried, in this case, the film is not favorably cured, and uncured portions are also generated. In this case, there are cases in which adhesiveness degrades.

In order to apply the composition for forming the resin layer including the solvent onto the acrylic base material including the organic fine particles A and the acrylic resin-containing binder and move the organic fine particles A to the resin layer, it is preferable to set the kind of the solvent, the amount of the solvent in the composition for forming the resin layer, the drying temperature, and the like to the above-described conditions.

Examples of the radiation of an active energy ray include the radiation of an ultraviolet ray or an electron beam.

Specific examples of an ultraviolet ray source in the radiation of an ultraviolet ray include light sources such as an ultrahigh-pressure mercury lamp, a high-pressure mercury lamp, a low-pressure mercury lamp, a carbon arc lamp, a black light fluorescent lamp, and a metal halide lamp. In addition, regarding the wavelength of the ultraviolet ray, it is possible to use an ultraviolet ray having a wavelength in a range of 190 nm to 380 nm.

Specific examples of an electron beam source in the radiation of an electron beam include a variety of electron beam accelerators such as a Cockroft Walton-type accelerator, a Van de Graft-type accelerator, a resonance transformer-type accelerator, an insulating core transformer-type accelerator, a straight accelerator, a Dainamitoron-type accelerator, and a high frequency-type accelerator.

Furthermore, in a case in which the photopolymerizable monomer and the like penetrate into the organic fine particles A, the photopolymerizable monomer and the like are also cured in the active energy ray radiation step, consequently, the binder component in the resin layer penetrated into the organic fine particles B is fixed in the organic fine particles B, and the average particle diameter becomes greater than that of the organic fine particles A.

The film thickness (when cured) of the resin layer is preferably in a range of 0.5 μm to 100 μm and more preferably in a range of 0.8 μm to 20 μm. In addition, since curling-preventing properties and crack-preventing properties are particularly excellent, the film thickness is still more preferably in a range of 2 μm to 10 μm and far still more preferably in a range of 2 μm to 5 μm. The film thickness of the resin layer is the average value (μm) obtained by observing a cross-section using an electron microscope (SEM, TEM, or STEM) and measuring the thicknesses at 10 arbitrary points.

In the resin layer, particles other than the organic fine particles B moved from the acryl base material (other particles) may be included.

When the resin layer composition includes the functional component, it is possible to further impart functions to the resin layer.

Examples of the functional component include components used for ordinary optical sheets such as an antistatic agent, a refractive index adjuster, an antifouling agent, a slip agent, an antiglare agent, and a hard coat property-imparting agent.

The antistatic agent is preferably an organic antistatic agent and more specific examples thereof include ionic antistatic agents such as lithium ion salts, quaternary ammonium salts, and ionic liquids and electron-conductive antistatic agents such as polythiophene, polyaniline, polypyrrole, and polyactylene.

Examples of the antifouling agent include antifouling agents such as fluorine and silicone.

In a case in which the functional component is used, the content thereof is preferably in a range of 0.1% by mass to 10% by mass in relation to the total mass of all the solid content of the composition for forming the resin layer.

Furthermore, in the optical laminated body of the present invention, in a case in which the resin layer is formed using the composition for forming the resin layer including the antistatic agent (that is, in a case in which the resin layer includes the antistatic agent), the antistatic agent is localized on the top surface of the resin layer due to the influence of the component moved from the acrylic base material and thus the antistatic performance further improves. In addition, in a case in which the resin layer is formed using the composition for forming the resin layer including ultrafine particles of silica, alumina, or the like as the hard coat property-imparting agent (that is, in a case in which the resin layer includes the hard coat property-imparting agent), the hard coat properties can be improved so that the pencil hardness regulated by JIS K5600-5-4 changes from 2H to 3H and from 3H to 4H compared with a case in which the hard coat property-imparting agent is not localized. In addition, since the hard coat property-imparting agent is localized, the amount of the inorganic ultrafine particles added to impart the hard coat properties may be extremely small compared with a case in which the hard coat property-imparting agent is added throughout the layers.

In addition, the optical laminated body of the present invention may include one or more selected from an antireflection layer, a hard coat layer, an antifouling layer, an anti-glare layer, an antistatic layer, and a high refractive index layer immediately on the resin layer.

<Antireflection Layer>

The antireflection layer is preferably formed using a composition for forming the antireflection layer including any of 1) a resin containing low refractive index inorganic fine particles such as silica or magnesium fluoride, 2) a fluorine-based resin which is a low refractive index resin, 3) a fluorine-based resin containing low refractive index inorganic fine particles such as silica or magnesium fluoride, and 4) a low refractive index inorganic thin film of silica, magnesium fluoride, or the like. As the resin other than the fluorine-based resin, the same resin as the above-described binder resin can be used.

In addition, the above-described silica is preferably hollow silica fine particles and the hollow silica fine particles can be produced using, for example, the manufacturing method described in the examples of JP-A-2005-099778.

The refractive index of the antireflection layer is preferably 1.47 or less and particularly preferably 1.42 or less. In addition, the thickness of the antireflection layer is not limited and, generally, may be appropriately set in a range of approximately 10 nm to 1 μm.

As the fluorine-based resin, a polymerizable compound including at least a fluorine atom in the molecule or a polymer thereof can be used. The polymerizable compound is not particularly limited, but is preferably, for example, a compound having a curing reactive group such as a functional group cured by ionizing radiation or a thermally curing polar group. In addition, a compound having the above-described reactive groups at the same time may be used. Compared with the polymerizable compound, the polymer does not include any reactive group and the like described above.

As the polymerizable compound having the functional group cured by ionizing radiation, it is possible to widely use a fluorine-containing monomer having an ethylenic unsaturated bond. More specific examples thereof include fluoroolefins (for example, fluoroethylene, vinylidene fluoride, tetrafluoroethylene, hexafluoropropylene, perfluorobutadiene, perfluoro-2,2-dimethyl-1,3-dioxole, and the like). Examples of the polymerizable compound having a (meth) acryloyloxy group include (meth)acrylate compounds having a fluorine atom in the molecule such as 2,2,2-trifluoroethyl (meth)acrylate, 2,2,3,3,3-pentafluoropropyl (meth) acrylate, 2-(perfluorobutyl)ethyl (meth)acrylate, 2-(perfluorohexyl)ethyl (meth)acrylate, 2-(perfluorooctyl) ethyl (meth)acrylate, 2-(perfluorodecyl)ethyl (meth)acrylate, methyl α-trifluoromethacrylate, and ethyl α-trifluoromethacrylate; fluorine-containing polyfunctional (meth) acrylic acid ester compounds having a fluoroalkyl group, a fluorocycloalkyl group, or a fluoroalkylene group which has at least 3 fluorine atoms in the molecule and has 1 to 14 carbon atoms and at least 2 (meth)acryloyloxy group; and the like.

Preferable examples of the thermally curing polar group include hydrogen bond-forming groups such as a hydroxyl group, a carboxyl group, an amino group, and an epoxy group. These groups are excellent in terms of not only the adhesiveness to coated films but also the affinity to inorganic ultrafine particles of silica or the like. Examples of the polymerizable compound having a thermosetting polar group include 4-fluoroethylene-perfluoroalkyl vinyl ether copolymers; fluoroethylene-hydrocarbon-based vinyl ether copolymers; fluorine-denatured products of individual resins of epoxy, polyurethane, cellulose, phenol, polyimide, and the like.

Examples of the polymerizable compound having both the functional group cured by ionizing radiation and the thermally curing polar group include partially or fully-fluorinated alkyls, alkenyls, and aryl esters of acrylic acid or methacrylic acid, fully or partially fluorinated vinyl ethers, fully or partially fluorinated vinyl esters, fully or partially fluorinated vinyl ketones, and the like.

In addition, examples of the fluorine-based resin include the following resins.

Examples thereof include polymers of a monomer or a monomer mixture including at least one of the fluorine-containing (meth)acrylate compounds of the polymerizable compound having an ionizing radiation curable group; copolymers of at least one of the fluorine-containing (meth)acrylate compounds and a (meth)acrylate compound having no fluorine atom in the molecule such as methyl (meth)acrylate, ethyl (meth)acrylate, propyl (meth)acrylate, butyl (meth)acrylate, or 2-ethylhexyl (meth)acrylate; homopolymers or copolymers of a fluorine-containing monomer such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene; and the like. Silicone-containing vinylidene fluoride copolymers obtained by adding a silicone component to the above-described copolymer can also be used. Examples of the silicone component in this case include (poly)dimethylsiloxane, (poly)diethylsiloxane, (poly)diphenylsiloxane, (poly)methylphenylsiloxane, alkyl-denatured (poly)dimethylsiloxane, azo group-containing (poly)dimethylsiloxane, dimethylsilicone, phenylmethyl silicone, alkyl-denatured silicone, aralkyl-denatured silicone, fluorosilicone, polyether-denatured silicone, aliphatic acid ester-denatured silicone, methyl hydrogen silicone, silanol group-containing silicone, alkoxy group-containing silicone, phenol group-containing silicone, methacryl-denatured silicone, acryl-denatured silicone, amino-denatured silicone, carboxylic acid-denatured silicone, carbinol-denatured silicone, epoxy-denatured silicone, mercapto-denatured silicone, fluorine-denatured silicone, polyether-denatured silicone, and the like. Among them, fluorine-based reins having a dimethylsiloxane structure are preferred.

Furthermore, non-polymers or polymers made of a compound described below can also be used as the fluorine-based resin. That is, it is possible to use compounds obtained by reacting a fluorine-containing compound having at least one isocyanate group in the molecule and a compound having at least one functional group which reacts with the isocyanate group such as an amino group, a hydroxyl group, or a carboxyl group in the molecule; compounds obtained by reacting a fluorine-containing polyol such as fluorine-containing polyether polyol, fluorine-containing alkylpolyol, fluorine-containing polyester polyol, or fluorine-containing ε-caprolactone-denatured polyol and a compound having an isocyanate group, and the like.

In addition, the composition for forming the antireflection layer may include the respective binder resins described above together with the polymerizable compound or polymer having a fluorine atom. Furthermore, it is possible to appropriately use a curing agent for curing the reactive groups and the like and use a variety of additives and solvents in order to improve coatability or impart antifouling properties.

In the formation of the antireflection layer, the viscosity of the composition for forming the antireflection layer is set in a range of 0.5 mPa·s to 5 mPa·s (25° C.) and preferably set in a range of 0.7 mPa·s to 3 mPa·s (25° C.) with which preferable coatability can be obtained. An excellent visible light antireflection layer can be realized, a uniform and evenly-coated thin film can be formed, and an antireflection layer having particularly excellent adhesiveness can be formed.

Means for curing the resin in the antireflection layer may be the same as means for curing the resin layer. In a case in which heating means is used for curing treatment, it is preferable that, for example, a radical is generated by heating and thus a thermopolymerization initiator that initiates the polymerization of the polymerizable compound is added to the composition for forming the antireflection layer.

In the optical laminated body of the present invention, the total light transmittance is preferably 80% or more. When the total light transmittance is less than 80%, in a case in which the optical laminated body is mounted in an image display device, there is a concern that color reproducibility or visibility may be impaired and there is another concern that a desired contrast cannot be obtained. The total light transmittance is more preferably 90% or more.

The total light transmittance can be measured using a haze meter (manufactured by Murakami Color Research Laboratory Co., Ltd., product No.; HM-150) and the method according to JIS K-7361.

In addition, in the optical laminated body of the present invention, the haze is preferably 1% or less. When the haze is 1% or less, desired optical characteristics are obtained and it is possible to prevent the degradation of optical characteristics when the optical laminated body of the present invention is installed on an image display surface. The haze is more preferably 0.5% or less. However, in a case in which anti-glare properties are provided as a function of the resin layer, the above-described values of the haze do not apply and the haze of the entire optical laminated body can be designed in a range of 1% to 50% due to the preferable anti-glare properties. In a case in which a video or a high-definition image having favorable contrast is required, the upper limit thereof is preferably set to 5% or less.

The haze can be measured using a haze meter (manufactured by Murakami Color Research Laboratory Co., Ltd., product No.; HM-150) and the method according to JIS K-7136.

A polarization plate of the present invention is formed by laminating the optical laminated body of the present invention on at least one surface of a polarization film.

The polarization film is not particularly limited and, for example, a polyvinyl alcohol film, a polyvinyl formal film, a polyvinyl acetal film, an ethylene-vinyl acetate copolymer-based saponified film, or the like, which is dyed with iodine or the like and is stretched, can be used. In the lamination treatment of the polarization film and the optical laminated body, it is preferable to carry out a saponification treatment on the acrylic base material. The saponification treatment improves adhesiveness and can also provide an antistatic effect.

The present invention provides an image display device including the optical laminated body and/or the polarization plate.

Examples of the image display device include televisions, computers, LCDs, PDPs, FEDs, ELDs (organic ELs and inorganic ELs), CRTs, tablet PCs, electronic paper, mobile phones, and the like. Furthermore, the image display device can also be preferably used as touch panels used in the image display device and the like.

An LCD which is a typical example described above includes a permeable display body and a light source device that radiates light to the permeable display body from the rear surface. In a case in which the image display device of the present invention is an LCD, the image display device is produced by forming the optical laminated body of the present invention and/or the polarization plate of the present invention on the front surface of the permeable display body. However, in the case of an image display device having a touch panel mounted therein, the optical laminated body and the polarization plate can also be used as a transparent substrate constituting the touch panel as well as on the front surface.

An LCD which is a typical example described above includes a permeable display body and a light source device that radiates light to the permeable display body from the rear surface. In a case in which the image display device of the present invention is an LCD, the image display device is produced by forming the optical laminated body of the present invention and/or the polarization plate of the present invention on the front surface of the permeable display body. In addition, in the case of an image display device having a touch panel mounted therein or even an LCD, depending on cases, the optical laminated body and the polarization plate can also be used as a transparent substrate constituting the inside of the device as well as on the front surface.

In a liquid-crystal display device of the present invention, a light source in a light source device radiates light from the bottom of the optical laminated body or the polarization plate. Meanwhile, a phase difference plate may be inserted between the liquid-crystal display device and the polarization plate. Adhesive layers may be provided as necessary between the respective layers in the liquid-crystal display device.

Here, in a case in which the present invention is a liquid-crystal display device including the optical laminated body, in the liquid-crystal display device, there is no particular limitation regarding a backlight source, but a white light-emitting diode (white LED) is preferred and the image display device of the present invention is preferably a VA-mode or IPS-mode liquid-crystal display device including a white light-emitting diode as the backlight source.

The white LED is a fluorescent body-type element, that is, which is made to emit white light by combining a light-emitting diode for which a compound semiconductor is used and which emits blue light or ultraviolet light and a fluorescent body. Among them, a white light-emitting diode made of a light-emitting element obtained by combining a blue light-emitting diode for which a compound semiconductor is used and an yttrium•aluminum•garnet-based yellow fluorescent body has a continuous and wide light-emitting spectrum and thus is effective for the improvement of antireflection performance and bright place contrast and also has an excellent light-emitting efficiency and thus is preferable as the backlight source in the present invention. In addition, it becomes possible to widely use a white LED having small power consumption and thus it becomes possible to exhibit an energy-saving effect.

In addition, the vertical alignment (VA) mode refers to an operation mode in which, when no voltage is applied, liquid crystal molecules are oriented so as to be perpendicular to the substrate of a liquid crystal cell and thus the screen displays dark and, when voltage is applied, liquid crystal molecules collapse and thus the screen displays bright.

In addition, the in-plane switching (IPS) mode refers to a method in which a liquid crystal is rotated in a substrate surface using a lateral-direction electric field applied to a comb-shaped electrode pair provided on one substrate of the liquid crystal cell and thus display is carried out.

A PDP which is the image display device is a device including a front surface glass substrate having an electrode formed on the front surface and a rear surface glass substrate which is disposed opposite to the front surface glass substrate with a discharge gas sealed between the glass substrates, includes an electrode and fine grooves formed on the front surface, and includes red, green, and blue fluorescent body layers formed in the grooves. In a case in which the image display device of the present invention is a PDP, the image display device includes the above-described optical laminated bodies on the front surface of the front surface glass substrate or a front surface plate (a glass substrate or a film substrate).

The image display device may be an image display device such as an ELD device in which zinc sulfide which emits light when voltage is applied, a diamine substance: a light-emitting body is deposited on a glass substrate and the voltage applied to the substrate is controlled, thereby carrying out display or a CRT in which an electrical signal is converted to light and an image visible to human eyes is generated. In this case, the above-described display devices include the above-described optical laminated body on the outermost surface or on the front surface of the front surface plate.

The optical laminated body of the present invention can be manufactured by applying the composition for forming the resin layer including the solvent onto the acrylic base material including the organic fine particles A and the acrylic resin-containing binder, moving the organic fine particles A to the resin layer composition, and drying the components, thereby forming the resin layer.

In order to move the organic fine particles A to the resin layer composition, the kind of the solvent, the amount of the solvent in the composition for forming the resin layer, the drying temperature, and the like are preferably set to the above-described preferred conditions.

In a case in which the resin layer composition is a curing composition, the optical laminated body can be manufactured by applying the curable resin composition including the solvent onto the acrylic base material including the organic fine particles A and the acrylic resin-containing binder, moving the organic fine particles A into the curable resin composition, drying the components, and curing the curable resin composition, thereby forming the resin layer.

In addition, in the method for improving the adhesiveness of the optical laminated body of the present invention, the composition for forming the resin layer including the solvent is applied on the acrylic base material including the organic fine particles A and the acrylic resin-containing binder, the organic fine particles A are moved to the resin layer composition, the composition is dried, and the resin layer is formed.

In order to appropriately improve the adhesiveness, the kind of the solvent, the amount of the solvent in the composition for forming the resin layer, the drying temperature, and the like are preferably set to the above-described preferred conditions.

In addition, in the method for preventing an interference pattern in the optical laminated body of the present invention, the composition for forming the resin layer including the solvent is applied on the acrylic base material including the organic fine particles A and the acrylic resin-containing binder, the organic fine particles A are moved to the resin layer composition, the composition is dried, and the resin layer is formed.

In order to appropriately prevent the interference pattern, the kind of the solvent, the amount of the solvent in the composition for forming the resin layer, the drying temperature, and the like are preferably set to the above-described preferred conditions.

EXAMPLES

Next, the present invention will be described in more detail using examples. The present invention is by no means limited to the examples.

Example 1

Preparation of Composition for Forming Resin Layer

Pentaerythritol triacrylate (50 parts by mass) and tetraethylene glycol diacrylate (50 parts by mass, manufactured by Toagosei Co., Ltd., "M240") were dissolved in methyl isobutyl ketone (150 parts by mass), thereby preparing a composition for forming the resin layer.

Furthermore, Table 1 describes the formulations of the compositions for forming the resin layer.

(Formation of Resin Layer)

The composition for forming the resin layer was applied onto a 40 μm acrylic base material including core-shell rubber particles having a three-layer structure in which a hard polymer obtained using methyl methacrylate as a main component is provided in the innermost layer, a soft elastic body polymerized using butyl acrylate as a main component is provided in the middle layer, and a hard polymer polymerized using methyl methacrylate as a main component is provided in the outermost layer and a polymer obtained using methyl methacrylate as a main component as a binder using a die coating method and was dried at 70° C. for one minute so as to evaporate the solvent, thereby forming a resin layer in which the amount of the composition applied after the drying reached 4 g/m². The obtained coated film was irradiated with an ultraviolet ray at an irradiance level of 200 mJ/cm² so as to be fully cured (in a full-cure state), thereby obtaining an optical laminated body having a cured film thickness of 3.2 μm.

Examples 2 to 12 and Comparative Examples 1 to 8

Optical laminated bodies were obtained in the same manner as in Example 1 except for the fact that the formulation of the composition for forming the resin layer was changed as described in Table 1. However, regarding Comparative Example 3, an acrylic base material not including core-shell rubber particles was used.

For the optical laminated bodies obtained in Examples 1 to 12 and Comparative Examples 1 to 8, the following evaluations were carried out. The results are described in Table 1.

(Vertical Difference Between Standard Height and Standard Depth)

As illustrated in FIG. 4, in a cross-section of the optical laminated body in the thickness direction, the acrylic base material-resin layer interface exhibited a ridge having crests and troughs, in an xy plane having an y axis in the thickness direction of the optical laminated body (here, the positive orientation was toward the resin layer) and an x axis in a direction perpendicular to the y axis, the standard length L of 30 μm was set in the x axis direction, 3 smallest points (4b-1) in terms of the y coordination were selected from plural infinitesimal points 4b of the ridge in the standard length L, the average y coordinate thereof was considered as the standard depth 5b, on the other hand, 3 largest points (4a-1) in terms of the y coordination were selected from plural maximal points 4a of the ridge in the standard length L, the average y coordinate thereof was considered as the standard height 5a, and the difference (absolute value) between the standard depth 5b and the standard height 5a served as the vertical difference between the standard depth 5b and the standard height 5a.

(Length of Ridge in Standard Length of 30 μm)

A cross-section of the obtained optical laminated body in the thickness direction was photographed using a scanning transmission electron microscope (STEM) and the length of the ridge was measured from the image on the basis of the above-described "method for measuring the length of the ridge in the standard length of 30 μm".

(Average Particle Diameter)

A photograph of a cross-section of the optical laminated body in the thickness direction was taken using a scanning transmission electron microscope (STEM), at a magnification in a range of 10,000 times to 30,000 times, for each of the organic fine particles A in the acrylic base material and the organic fine particles B in the resin layer, ten organic fine particles were randomly extracted from the above-described image, the diameters of the respective particles were calculated, and then the number average value thereof is used as the average particle diameter. On the same cross-section of the optical laminated body, the same measurement was carried out three times and the average value of the three measurement values was used as the final average particle diameter.

(Swelling of Organic Fine Particles)

The swelling of the organic fine particles was evaluated on the basis of the following standards using the ratio between the average particle diameter of the organic fine particles A in the acrylic resin base material and the average particle diameter of the organic fine particles B in the resin layer.

A: The ratio of the average particle diameter of the organic fine particles B to the average particle diameter of the organic fine particles A was 1.05 times or more.

C: The ratio of the average particle diameter of the organic fine particles B to the average particle diameter of the organic fine particles A was less than 1.05 times.

(Adhesiveness)

On the basis of JIS K 5600, 1 mm×1 mm cells were drawn on the resin layer in the optical laminated body so that the sum of the cells reached 100, a peeling test was continuously carried out 5 times using a 24 mm CELLOTAPE (registered trademark) manufactured by Nichiban Co., Ltd., and the number of remaining cells was counted.

(Interference Pattern)

After black tape was attached to a surface opposite to the resin layer in the optical laminated body, the presence of an interference pattern was visually evaluated under a three-wavelength tube fluorescent lamp and a sodium lamp manufactured by Funatech Co., Ltd. In a case in which no interference pattern could be observed under any of the fluorescent lamp and the sodium lamp, the optical laminated body was evaluated to be AA, in a case in which a three-wavelength interference pattern could not be observed under the three-wavelength tube fluorescent lamp but an interference pattern could be vaguely observed under the sodium lamp, the optical laminated body was evaluated to be A, in a case in which an interference pattern could be vaguely observed under the three-wavelength tube fluorescent lamp, the optical laminated body was evaluated to be B, and, in a case in which an interference pattern could be observed under both the three-wavelength tube fluorescent lamp and the sodium lamp, the optical laminated body was evaluated to be C.

(Haze)

The haze value (%) of the optical laminated body was measured using a haze meter (manufactured by Murakami Color Research Laboratory Co., Ltd., product No.; HM-150) according to JIS K-7136. In the optical laminated body in which the haze value was 1.0% or less, the haze was slightly favorable.

(Pencil Hardness)

After the humidity of the optical laminated body was adjusted for two hours under conditions of a temperature of 25° C. and a relative humidity of 60%, a pencil hardness test (with a load of 500 g) regulated by JIS K5600-5-4 (1999) was carried out using a testing pencil regulated by JIS-S-6006 and the highest hardness at which no scratch was generated was measured.

A tensile test was carried out using a TENSILON universal material testing instrument (RTG-1310 manufactured by A&D Company, Limited.) and fracture resistance was evaluated. A sample having a width of 10 mm and a length of 100 mm was taken from the optical laminated body, the sample was extended at 100 mm/minute using the TENSILON, and the fracture resistance was evaluated on the basis of the following standards.

A: The specimen was not fractured even under a tension of 15 N or higher.

C: The specimen was fractured under a tension of 15 N or lower.

(Surface Resistivity)

For each of the optical laminated bodies produced in the examples and the comparative examples, the surface resistivity ($\Omega/\square$) was measured using a surface resistance meter (Hiresta HT-210 manufactured by Mitsubishi Chemical Analytech Co., Ltd.).

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Base material | | | Particles included | Particles included | Particles included | Particles included | Particles included | Particles included | Particles included | Particles included | Particles included | Particles included |
| Composition for forming resin layer (parts by mass) | Monomer | PETA | 50 | 50 | 50 | | 25 | | | | | |
| | | DPHA | | | | | 25 | 50 | 50 | | 50 | 50 |
| | | M240 | 50 | 50 | 50 | 50 | | | | | 25 | 25 |
| | | TMPTA | | | | 50 | | | | | | |
| | | ALEN10 | | | | | 25 | | | | | |
| | Oligomer | BS577 | | | | | | 25 | 25 | 50 | 20 | 20 |
| | | UV1700B | | | | | 25 | | | | | |
| | | R1403MB | | | | | | | 25 | | | |
| | Polymer | BS371 | | | | | 25 | | | 50 | | |
| | Antistatic agent 1 | | | | | | | | | | 5 | |
| | Antistatic agent 2 | | | | | | | | | | | 5 |
| | Antistatic agent 3 | | | | | | | | | | | |
| | Reactive silica | | | | | | | | | | | |
| | Solvent | MIBK | 150 | | 100 | 150 | 150 | 150 | 150 | 150 | 150 | 150 |
| | | n-Butanol | | 150 | 30 | | | | | | | |
| | | MEK | | | 20 | | | | | | | |
| | Initiator | Irg184 | 4 | 4 | 4 | 4 | 4 | 4 | 4 | 4 | 4 | 4 |
| Average particle diameter of resin particles A (μm) | | | 0.25 | 0.25 | 0.25 | 0.25 | 0.25 | 0.25 | 0.25 | 0.25 | 0.25 | 0.25 |
| Average particle diameter of resin particles B (μm) | | | 0.35 | 0.33 | 0.35 | 0.35 | 0.35 | 0.35 | 0.35 | 0.35 | 0.35 | 0.35 |
| Ratio of average particle diameters (times) | | | 1.40 | 1.32 | 1.40 | 1.40 | 1.40 | 1.40 | 1.40 | 1.40 | 1.40 | 1.40 |
| Swelling of resin particles | | | A | A | A | A | A | A | A | A | A | A |
| Average maximum crest height (nm) | | | 200 | 200 | 400 | 200 | 180 | 200 | 200 | 160 | 200 | 200 |
| Length of ridge (μm) | | | 35 | 35 | 40 | 35 | 34 | 35 | 35 | 32 | 35 | 35 |
| Evaluation | Adhesiveness | | 100 | 100 | 100 | 100 | 100 | 100 | 100 | 100 | 100 | 100 |
| | Interference pattern | | AA | AA | AA | AA | A | AA | AA | A | AA | AA |
| | Haze | | 0.3 | 0.3 | 0.3 | 0.3 | 0.3 | 0.3 | 0.3 | 0.3 | 0.3 | 0.3 |
| | Pencil hardness | | 3H | 3H | 3H | 3H | 3H | 3H | 3H | 3H | 3H | 3H |
| | Fracture resistance | | A | A | A | A | A | A | A | A | A | A |
| | Surface resistivity ($\Omega/\square$) | | — | — | — | — | — | — | — | — | $1.0 \times 10^9$ | $1.0 \times 10^9$ |

(Fracture Resistance)

TABLE 2

| | Examples | | Comparative Examples | | | | | | | |
|---|---|---|---|---|---|---|---|---|---|---|
| | 11 | 12 | 1 | 2 | 3 | 4 | 5 | 6 | 7 | 8 |
| Base material | Particles included | Particles included | Particles included | Particles included | Particles not included | Particles included | Particles included | Particles included | Particles included | Particles included |

TABLE 2-continued

|  |  |  | Examples |  | Comparative Examples |  |  |  |  |  |  |  |
|---|---|---|---|---|---|---|---|---|---|---|---|---|
|  |  |  | 11 | 12 | 1 | 2 | 3 | 4 | 5 | 6 | 7 | 8 |
| Composition for forming resin layer (parts by mass) | Monomer | PETA |  |  | 50 |  | 50 |  |  |  |  | 50 |
|  |  | DPHA | 10 | 60 |  |  |  | 60 | 50 |  |  |  |
|  |  | M240 | 40 |  | 50 |  | 50 |  | 25 | 100 | 100 | 50 |
|  |  | TMPTA |  |  |  |  |  |  |  |  |  |  |
|  |  | ALEN10 |  |  |  |  |  |  |  |  |  |  |
|  | Oligomer | BS577 | 40 |  |  |  |  |  | 20 |  |  |  |
|  |  | UV1700B |  |  |  |  |  |  |  |  |  |  |
|  |  | R1403MB |  |  |  |  |  |  |  |  |  |  |
|  | Polymer | BS371 |  |  |  | 100 |  |  |  |  |  |  |
|  | Antistatic agent 1 |  |  |  |  |  |  |  | 5 |  |  |  |
|  | Antistatic agent 2 |  |  |  |  |  |  |  |  |  |  |  |
|  | Antistatic agent 3 |  |  | 10 |  |  |  |  |  |  |  |  |
|  | Reactive silica |  |  | 40 |  |  |  | 40 |  |  |  |  |
|  | Solvent | MIBK | 150 | 150 |  |  | 150 | 70 | 70 | 70 |  | 150 |
|  |  | n-butanol |  |  | 50 | 100 |  |  |  |  |  |  |
|  |  | MEK |  |  |  |  |  |  |  |  |  | 150 |
|  |  | Water |  |  |  |  |  |  |  |  | 150 |  |
|  | Initiator | Irg184 | 4 | 4 | 4 | 4 | 4 | 4 | 4 | 4 | 4 | 4 |
| Average particle diameter of resin particles A (μm) |  |  | 0.25 | 0.25 | 0.25 | 0.25 | — | 0.25 | 0.25 | 0.25 | 0.25 | 0.25 |
| Average particle diameter of resin particles B (μm) |  |  | 0.35 | 0.35 | 0.26 | 0.26 | — | 0.26 | 0.26 | 0.26 | 0.25 | 0.40 |
| Ratio of average particle diameters (times) |  |  | 1.40 | 1.40 | 1.04 | 1.04 | — | 1.04 | 1.04 | 1.04 | 1.00 | 1.60 |
| Swelling of resin particles |  |  | A | A | C | C | — | C | C | C | C | A |
| Average maximum crest height (nm) |  |  | 200 | 160 | 0.1 | 0.1 | 0.1 | 0.1 | 0.1 | 0.1 | 0.05 | 550 |
| Length of ridge (μm) |  |  | 35 | 32 | 30.2 | 30.2 | 30.2 | 30.2 | 30.2 | 30.2 | 30.0 | 46 |
| Evaluation | Adhesiveness |  | 100 | 100 | 30 | 0 | 0 | 0 | 0 | 100 | 0 | 100 |
|  | Interference pattern |  | AA | A | C | C | C | B | C | C | C | AA |
|  | Haze |  | 0.3 | 0.3 | 0.3 | 0.3 | 0.2 | 0.3 | 0.3 | 0.3 | 0.3 | 2.1 |
|  | Pencil hardness |  | 3H | 4H | 2H | 2H | 2H | 3H | 2H | H | H | 2H |
|  | Fracture resistance |  | A | A | C | C | C | C | C | C | C | C |
|  | Surface resistivity (Ω/□) |  | $1.0 \times 10^{10}$ | — | — | — | — | — | $1.0 \times 10^{13}$ | — | — | — |

As is clear from Table 1 and 2, in the optical laminated bodies of Examples 1 to 12, the vertical differences of the ridges in the acrylic base material-resin layer interface were in a range of 150 nm to 500 nm and thus the generation of an interference pattern was prevented and the adhesiveness between the acrylic base material and the resin layer was favorable. Meanwhile, in the optical laminated bodies of Examples 1 to 12, the kinds of the solvents, the amounts of the solvents, and the drying temperatures were appropriate and the optical laminated bodies included a monomer and/or an oligomer and thus it is considered that it was possible to set the vertical differences of the ridges in the above-described range.

Meanwhile, in the optical laminated bodies of Examples 1 to 12, the thicknesses of the acrylic base materials decreased in a range of 1 μm to 4 μm after the formation of the resin layer on the acrylic base material. In addition, in the optical laminated bodies of Examples 1 to 12, the ratios of the number of the organic fine particles B in the region T to the number of the organic fine particles B in the region S were 3% or less.

On the other hand, in the optical laminated bodies of Comparative Examples 1 to 8, the vertical differences of the ridges in the acrylic base material-resin layer interface were outside the range of 150 nm to 500 nm and thus the generation of an interference pattern could not be prevented and the adhesiveness between the acrylic base material and the resin layer was not favorable. Meanwhile, while preferred solvents were used in Comparative Examples 1 and 4 to 6, the ratios of the preferred solvent to the total solvents were low and thus it is considered that the acrylic resin-containing binder in the acrylic base material and the binder resin in the resin layer could not be mixed and integrated together near the acrylic base material-resin layer interface. In Comparative Example 2, while the ratio of the preferred solvent was favorable, the resin component used did not include a monomer and/or an oligomer and only included a polymer that was not capable of easily intruding into the acrylic base material and thus it is considered that the organic fine particles A did not move into the resin layer. In Comparative Example 3, while the organic fine particles A moved into the resin layer, the binder component in the acrylic base material was also moved into the resin layer, and thus the organic fine particles and the binder component were integrated together in the acrylic base material-resin layer interface, the organic fine particles A were not used and thus it is considered that the effect of the movement was degraded, the organic fine particles and the binder component were not integrated together, and the fracture resistance also deteriorated. In Comparative Example 7, the solvent was inappropriate, the acrylic base material did not swell at all, and it is considered that the organic fine particles A did not move into the resin layer. On the other hand, in Comparative Example 8, since the fraction of methyl ethyl ketone in the solvent was too high, it is considered that the vertical difference of the ridge became too great and the haze increased.

In addition, when the length of the ridge was 33 μm or more, particularly, the adhesiveness was stable and thus favorable. The results of the adhesiveness tests carried out on the optical laminated body of Example 8 (the length of the ridge: 32 μm) and the optical laminated body of Example 5 (the length of the ridge: 34 μm) at five positions respectively show that, while there was no case in which cells were peeled off but there was a case in which the corner of the notched portion was slightly peeled off in the optical laminated body of Example 8, in the optical laminated body of Example 5, even the notched portion remained closely attached.

Furthermore, in a case in which the length of the ridge exceeded 42 µm, in spite of the vertical difference of the ridge in the acrylic base material-resin layer interface being in a range of 200 µm to 400 µm, while not detected using the haze value, the optical laminated body became extremely slightly turbid, compared with an optical laminated body in which the length of the ridge was 42 µm or less, in a strict visual inspection of the appearance in which the appearance of the optical laminated body mounted on a black acrylic plate or the like was inspected in a bright room. However, in spite of the above-described fact, the optical laminated body can still be produced as a product.

Meanwhile, in the optical laminated bodies of Comparative Examples 1 to 7, the thickness decreases after the formation of the resin layer on the acrylic base material were less than 1 µm.

PETA: Pentaerythritol triacrylate
DPHA: Dipentaerythritol hexaacrylate, manufactured by Nippon Kayaku Co., Ltd.
M240: Tetraethylene glycol diacrylate, manufactured by Toagosei Co., Ltd., "M240", molecular weight: 286
TMPTA: Trimethylolpropane triacrylate, manufactured by Nippon Kayaku Co., Ltd.
ALEN10: Ethoxylated o-phenylphenol acryalte, manufactured by Shin-Nakamura Chemical Co., Ltd.
BS577: Urethane acrylate, manufactured by Arakawa Chemical Industries, Ltd.
UV1700B: Urethane acrylate, manufactured by The Nippon Synthetic Chemical Industry Co., Ltd.
R1403 MB: High-refractive index urethane acrylate, manufactured by Daiichi Kogyo Seiyaku Co., Ltd., "R1403"
BS371: Polymer acrylate, manufactured by Arakawa Chemical industries, Ltd.
Antistatic agent 1: Quaternary ammonium salt-containing polymer, manufactured by Taisei Fine Chemical Co., Ltd., "1SX3000"
Antistatic agent 2: Quaternary ammonium salt-containing compound, COLCOAT NR121X, manufactured by Colcoat Co., Ltd.
Antistatic agent 3: Lithium bistrifluoromethane sulfoneimide, manufactured by Sumitomo 3M Limited, LJ-603010
Reactive silica: manufactured by Nissan Chemical Industries, Ltd., "MIBKSD", average particle diameter: 12 nm
MIBK: Methyl isobutyl ketone
MEK: Methyl ethyl ketone
Irg184: manufactured by BASF, "Irg184"

INDUSTRIAL APPLICABILITY

The hard coat film of the present invention can be preferably used for cathode-ray tube display devices (CRT), liquid crystal displays (LCD), plasma displays (PDP), electroluminescence displays (ELD), touch panels, electronic paper, displays in mobile phones and the like, and, particularly, high-definition displays.

REFERENCE SIGNS LIST

1 Acrylic base material
2 Resin layer
2a Surface of resin layer
3a Organic fine particles in acrylic base material
3b Organic fine particles in resin layer
4 Interface between an acrylic base material and a resin layer
4a Maximal point
4a-1 Maximal point having largest y coordinate (3 points)
4b Infinitesimal point
4b-1 Infinitesimal point having smallest y coordinate (3 points)
5a Standard height
5b Standard depth
h Vertical difference between standard height and standard depth
L Perpendicular line L
R Perpendicular line R
$L_1$ Intersection point $L_1$
$L_2$ Intersection point $L_2$
$R_1$ Intersection point $R_1$
$R_2$ Intersection point $R_2$
$L_m$ Intersection point $L_m$
$R_m$ Intersection point $R_m$
S Region S
T Region T
$h_1$ Average height

The invention claimed is:

1. An optical laminated body, comprising:
a resin layer comprising a binder resin and organic fine particles B on one surface of an acrylic base material comprising organic fine particles A,
wherein, in a standard length of 30 µm taken in a direction perpendicular to a thickness direction of the optical laminated body on a cross-section of the optical laminated body in the thickness direction, when an average depth of three deepest troughs selected from plural troughs in an interface between the acrylic base material and the resin layer is considered as a standard depth and then an average height of three highest crests selected from plural crests in the interface is considered as a standard height, a vertical difference between the standard height and the standard depth is in a range from 150 nm to 500 nm, and
a ratio of an average particle diameter $D_b$ of the organic fine particles B relative to an average particle diameter $D_a$ of the organic fine particles A is in a range from 1.05 to 1.80.

2. The optical laminated body according to claim 1, wherein the organic fine particles A do not form an agglomerate and the average particle diameter thereof is in a range of 10 nm to 400 nm.

3. The optical laminated body according to claim 1, wherein, on a cross-section of the optical laminated body in the thickness direction, a ratio of a number of the organic fine particles B in a region T, which occupies a depth of 10% from a surface at an opposite side to the acrylic base material in a region S in the resin layer, to a number of the organic fine particles B in the region S is 3% or less,
wherein the region S is an area bounded by a top surface of the resin layer, an interface between the acrylic base material and the resin layer, a line L, and a line R, wherein the line L and the line R are perpendicular to the top surface of the resin layer and are 10 µm apart from each other.

4. The optical laminated body according to claim 1, wherein the organic fine particles B are not exposed on an outermost surface of the resin layer.

5. The optical laminated body according to claim 1, wherein the organic fine particles B are organic fine particles that comprise the binder resin and the organic fine particles A.

6. The optical laminated body according to claim 1, wherein the resin layer is a hard coat layer.

7. The optical laminated body according to claim 1, wherein the resin layer further comprises a functional component.

8. A polarization plate formed by laminating the optical laminated body according to claim 1 on at least one surface of a polarization film.

9. An image display device, comprising:
the optical laminated body according to claim 1.

10. A method for manufacturing the optical laminated body according to claim 1, comprising:
applying a composition for forming a resin layer comprising a solvent on the acrylic base material comprising the organic fine particles A and an acrylic resin-containing binder, so that the organic fine particles A are moved into the composition, and
drying the composition so as to form the resin layer.

11. The method for manufacturing the optical laminated body according to claim 10,
wherein the solvent comprises methyl isobutyl ketone.

12. The method for manufacturing the optical laminated body according to claim 11,
wherein the solvent further comprises an alcohol.

13. A method for improving adhesiveness of the optical laminated body according to claim 5, the method comprising:
applying a composition for forming the resin layer comprising a solvent on the acrylic base material comprising the organic fine particles A and an acrylic resin-containing binder; and
drying the composition so as to form the resin layer,
wherein the organic fine particles A are moved into the resin layer composition, and
the organic fine particles A moved into the resin layer composition comprise at least part of components in the resin layer composition.

14. A method for preventing an interference pattern in an optical laminated body according to claim 5, the method comprising:
applying a composition for forming the resin layer comprising a solvent on acrylic base material comprising the organic fine particles A and an acrylic resin-containing binder; and
drying the composition so as to form the resin layer,
wherein the organic fine particles A are moved into the resin layer composition, and
the organic fine particles A moved into the resin layer composition comprise at least part of components in the resin layer composition.

15. An optical laminated body, comprising:
a resin layer comprising a binder resin and organic fine particles B on one surface of an acrylic base material comprising organic fine particles A,
wherein the organic fine particles B are organic fine particles that comprise the binder resin and the organic fine particles A, and
in a standard length of 30 µm taken in a direction perpendicular to a thickness direction of the optical laminated body on a cross-section of the optical laminated body in the thickness direction, when an average depth of three deepest troughs selected from plural troughs in an interface between the acrylic base material and the resin layer is considered as a standard depth and then an average height of three highest crests selected from plural crests in the interface is considered as a standard height, a vertical difference between the standard height and the standard depth is in a range of 150 nm to 500 nm.

* * * * *